(12) United States Patent
Buytaert et al.

(10) Patent No.: US 6,573,823 B1
(45) Date of Patent: Jun. 3, 2003

(54) METHOD AND DEVICE FOR IDENTIFYING VEHICLES

(75) Inventors: Steven Herwig Cyriel Buytaert, Kessel-Lo (BE); Marc Jozef Maria Maes, Genk (BE)

(73) Assignee: Acunia, naamloze vennootschap (BE)

( * ) Notice: Subject to any disclaimer, the term of this patent is extended or adjusted under 35 U.S.C. 154(b) by 0 days.

(21) Appl. No.: 09/424,844

(22) PCT Filed: Jun. 9, 1998

(86) PCT No.: PCT/BE98/00083

§ 371 (c)(1),
(2), (4) Date: Dec. 6, 1999

(87) PCT Pub. No.: WO98/56626

PCT Pub. Date: Dec. 17, 1998

(30) Foreign Application Priority Data

Jun. 10, 1997 (BE) .............................................. 9700493

(51) Int. Cl.[7] .............................................. G05B 19/00
(52) U.S. Cl. .................... 340/5.27; 340/5.21; 340/5.24; 701/32; 307/10.2
(58) Field of Search .............................. 340/5.26, 5.27, 340/5.31, 5.5, 5.72, 5.21, 5.24; 701/32, 36, 49; 705/13; 307/10.2

(56) References Cited

U.S. PATENT DOCUMENTS 5,229,648 A * 7/1993 Sues et al. .................. 307/10.2
5,572,193 A * 11/1996 Flanders et al. ....... 340/825.34
5,751,973 A * 5/1998 Hassett ........................ 395/213

FOREIGN PATENT DOCUMENTS

NL    WO 95/11501    * 4/1995

* cited by examiner

*Primary Examiner*—Julie Lieu
(74) *Attorney, Agent, or Firm*—Bacon & Thomas, PLLC

(57) ABSTRACT

A method for identifying a vehicle including retrieving characterizing data stored by an electronic system with an on-board control unit, transmitting vehicle identity data and the characterizing data with the on-board control unit to a central control system, transforming the vehicle identity data and the characterizing data into at least two data sets which combine to define a unique identifier, storing at least a first data set on the central control database, transmitting at least a second data set to the on-board control unit, and storing the second data set on the on-board control unit that defines an identification number for the vehicle.

16 Claims, 1 Drawing Sheet

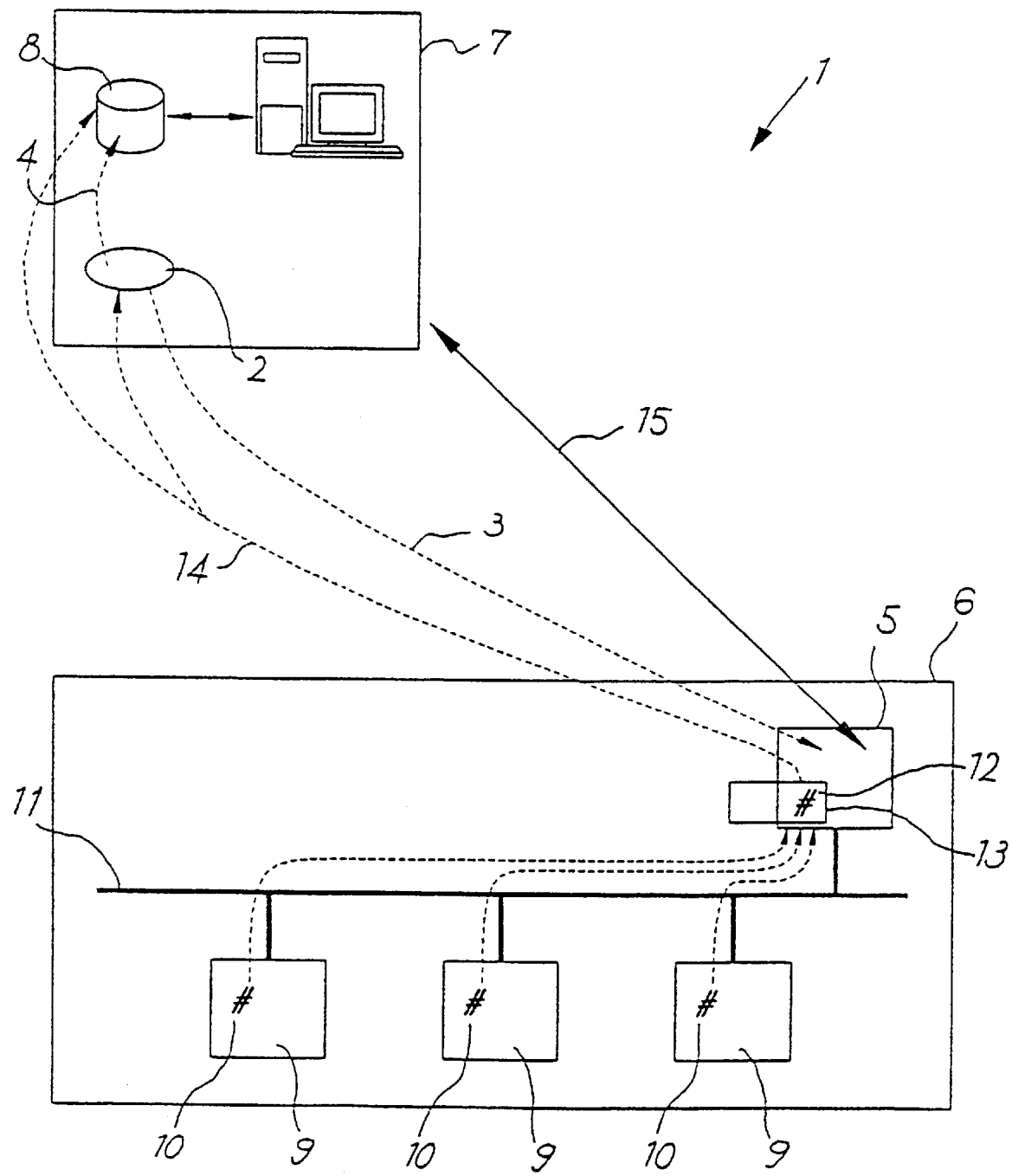

METHOD AND DEVICE FOR IDENTIFYING VEHICLES

BACKGROUND OF THE INVENTION

This invention relates to a method and device for identifying vehicles, more particularly cars.

In particular, the invention relates to a device for providing and connecting an identification to vehicles, whereby this device also allows to perform regular controls.

Devices for identifying vehicles are known from the documents WO 95/11101, WO 95/10433, EP 0.387.581, WO 93/05987, U.S. Pat. No. 5,587,575 and DE 43.42.641. According to the solutions given in most of these documents, the vehicles and the central system for controlling the vehicles are provided with the same code or data, resulting in a few reliable situation.

SUMMARY OF THE INVENTION

The present invention aims an improved system.

To this aim, the invention in the first place provides for a method for identifying vehicles, more particularly cars, characterized in that, during registration, by means of a transformation at least two different data are generated which together form a unique result, whereby one of the data is stored with the vehicle, whereas the other data is stored in a central system.

Preferably, the aforementioned transformation consists of a cryptographic transformation, more particularly a cryptographic transformation which delivers results which are always unique and vary for each variation of the initial data.

As a consequence thereof, it is obtained that it is almost impossible to falsify the identification data of the vehicle, which, however, is the case with the use of classical serial numbers which, as known, can be ground away or the like.

In the most preferred form of embodiment, this method is further characterized in that it consists of:

the provision of one or more electronic systems in the vehicle which can form a part of the vehicle;

the provision of an electronic unit in the vehicle which unit can communicate with a central system with a data base, whereby this unit is connected to one or more of the aforementioned electronic systems;

the effecting, by means of the aforementioned unit, of communications with the aforementioned electronic system, the aforementioned electronic systems, respectively, by means of which at the unit characterizing data can be called in by the electronic systems;

the transmittance of these data to the central system, together with identity data of the unit;

the performance, based upon these data and identity date, of a transformation of these data by the central system, whereby at least two data are generated which together are unique;

the central storage of at least one of these generated data;

and communicating the other generated data back to the module and storing it there, whereby this data forms an identification number for the vehicle.

The aforementioned connection preferably is realized with several electronic systems present in the vehicle. This connection is preferably performed over a common bus, more particularly a so-called CAN bus (Controller Area Network), according to ISO-11898.

According to another preferred characteristic of the invention, the exchange of the data between the unit and the electronic systems is performed by means of a protected communication over the aforementioned bus.

According to another characteristic of the invention, regular controls are automatically performed by means of the aforementioned unit, whereby this unit verifies the authenticity and the originality of each electronic system which has communicated its data.

Depending on the verification, it is possible to transmit a signal through the unit back to one or more of the electronic systems, whereby this signal is applied in order to take a suitable action, if necessary. According to the invention, this suitable action may consist in making the vehicle unserviceable in a reversible and safe manner.

According to another characteristic of the invention, means are applied which allow that the central system can provide for that, by means of a protected communication, the aforementioned regular controls can be switched off. This allows to make a vehicle rendered unserviceable serviceable again.

In a practical form of embodiment, the identity of the unit is formed by means of a so-called chip card, as a result of which the identification is also connected to the proprietor of the chip card.

The invention also relates to a device for the realization of the aforementioned method, with as a characteristic that it consists in the combination of at least means for generating, by means of an electronic transformation, at least two data which together are unique; an electronic unit which is provided or can be provided in the vehicle, in which one of the aforementioned data can be stored; a central system in which the other of the aforementioned two data can be stored.

Hereby, the aforementioned unit is coupled to different electronic systems of the vehicle, and the unit is provided with control means which verify the characterizing data of the electronic systems for their authenticity.

In the case that the device is provided with means which allow for a communication between the central system and the unit, they preferably consist of transmitting and receiving apparatus allowing for a wireless communication, and/or a connection which allows a coupling to external apparatus, for example, diagnostic apparatus of a workshop.

BRIEF DESCRIPTION OF THE DRAWINGS

With the intention of better showing the characteristics of the invention, hereafter, as an example without any limitative character, a preferred form of embodiment is described, with reference to the sole accompanying drawing which schematically represents a device according to the invention.

DETAILED DESCRIPTION OF THE INVENTION

As represented, the device 1 substantially consists of means 2 for generating, by means of an electronic transformation, at least two data 3–4 which together are unique; an electronic unit 5, for example in the form of a module, which is provided or can be provided in the vehicle in which one of the aforementioned data, in this case, data 3, can be stored; and a central system 7 with a data base 8 in which the other of the aforementioned two data, in other words, data 4, can be stored.

The unit 5 is coupled to different electronic systems 9 of the vehicle 6 and comprises control means which verify the characterizing data 10 of the electronic systems 9 for their authenticity, which, as mentioned in the introduction, is performed by means of an electronic data bus 11, preferably by means of a protected communication.

The unit 5 is characterized by an identity data 12 which, for example, is obtained by making use of a chip card 13.

During the registration of the vehicle 6, the data, the aforementioned data 10, on one hand, and the identity data 12, on the other hand, are transmitted to the central system 7, which is schematically indicated by line 14. By means of these data, a cryptographic transformation is performed by the means 2, which results in the data 3 and 4.

One data 4 is taken up in the data base 8. The other data 3 is communicated back to the unit 4 and stored there and forms an identification number.

The transmittance of data according to line 14 and of data 3 is performed by means of the aforementioned bi-directional communication.

By means of an also bi-directional communication 15, controls may now be performed by checking whether the different data mutually coincide.

In order to realize these communications, the device, of course, is provided with the means necessary to this end. These means may consist of transmitting and receiving apparatus allowing for a wireless communication, and/or a connection allowing for a coupling with external apparatus, for example, diagnostic apparatus of a workshop.

The present invention is by no means limited to the form of embodiment described as an example and represented in the accompanying figure, on the contrary may such method and device be realized according to various variants without leaving the scope of the invention.

What is claimed is:

1. A method for identifying a vehicle having a vehicle data processing system that communicates with a remote central control system including a database, the vehicle data processing system includes an on-board control unit and at least one electronic system storing characterizing data and connected to the on-board control unit, the on-board control unit storing vehicle identity data and being in communication with the central control system, the method comprising the steps of:

retrieving the characterizing data stored by the electronic system with the on-board control unit;

transmitting the vehicle identity data and the characterizing data with the on-board control unit to the central control system;

transforming the vehicle identity data and the characterizing data into at least two data sets which combine to define a unique identifier;

storing at least one data set on the central control database;

transmitting at least another data set to the on-board control unit; and storing the another data set on the on-board control unit, said another data set defining an identification number for the vehicle.

2. The method according to claim 1, wherein the identity data and the characterizing data undergo a cryptographic transformation.

3. The method according to claim 1, wherein the at least two data sets are unique and variable, and depend on the vehicle identity data and the characterizing data.

4. The method according to claim 1, wherein the data processing system includes at least three electronic systems connected via a common data bus.

5. The method according to claim 4, wherein the common data bus is a controller area network bus.

6. The method according to claim 4, wherein the exchange of data between the electronic system and the on-board control unit is performed via a secure communication.

7. The method according to claim 1, further comprising the step of evaluating the authenticity and originality of data communicated to the on-board control unit.

8. The method according to claim 7, further comprising the step of transmitting an evaluation signal from the on-board control unit to the electronic system.

9. The method according to claim 7, further comprising the steps of transmitting the evaluation signal to the central control system, comparing the evaluation signal with the database and sending a protected communication to the on-board control unit to disable the vehicle if the evaluation signal fails to match a predetermined criteria.

10. The method according to claim 9, wherein the vehicle is disabled in a reversible and safe manner.

11. The method according to claim 1, wherein the vehicle identity data is stored on a chip card stored by and in communication with the on-board control unit.

12. A vehicle verification system comprising:

a remote central control system including a database; and a vehicle data processing system, said vehicle data processing system including:

an on-board control unit storing vehicle identity data and being in communication with the central control system; and at least one electronic system connected to the on-board control unit and storing characterizing data;

wherein said on-board control unit is configured to retrieve and verify the authenticity of the characterizing data stored by the electronic system;

wherein said on-board control unit is configured to transmit the characterizing data and the vehicle identity data to the central control system such that the central control system transforms the characterizing data and the identity data into at least two sets of data that combine to form a unique identifier.

13. The system according to claim 12, further comprising a chip card having the identity data stored thereon, said on-board control unit arranged to receive the chip card and retrieve the identity data.

14. The system according to claim 12, wherein the on-board control unit and the central control system are linked via a bi-directional communication link.

15. The system according to claim 14, wherein the bi-directional communication link is a wireless communication apparatus.

16. The system according to claim 14, wherein the communication link includes a connection permitting coupling to a remote, diagnostic communication apparatus.

* * * * *